(12) United States Patent
Wiegand et al.

(10) Patent No.: US 7,817,723 B2
(45) Date of Patent: Oct. 19, 2010

(54) APPARATUS AND METHOD OF OPTIMIZING MOTION ESTIMATION PARAMETERS FOR ENCODING A VIDEO SIGNAL

(75) Inventors: Thomas Wiegand, Berlin (DE); Heiko Schwarz, Berlin (DE); Brad Schumitsch, San Francisco, CA (US)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 1305 days.

(21) Appl. No.: 11/012,631

(22) Filed: Dec. 14, 2004

(65) Prior Publication Data
US 2006/0126734 A1 Jun. 15, 2006

(51) Int. Cl.
H04N 7/28 (2006.01)
H04N 7/50 (2006.01)

(52) U.S. Cl. .............. 375/240.27; 375/240; 375/240.16

(58) Field of Classification Search ................... 375/240
See application file for complete search history.

(56) References Cited

U.S. PATENT DOCUMENTS

2003/0063672 A1* 4/2003 Laurent-Chatenet ... 375/240.16
2004/0228410 A1* 11/2004 Ameres et al. ......... 375/240.18

OTHER PUBLICATIONS

Laurent, N.; Lechat, P.; Sanson, H., "Limitation of triangles overlapping in mesh-based motion estimation using augmented Lagrangian," Image Processing, 1998. ICIP 98. Proceedings. 1998 International Conference on , vol. 2, No., pp. 223-227 vol. 2, Oct. 4-7, 1998.*

Schittkowski, K. "On the Convergence of a Sequential Quadratic Programming Method with an Augmented Lagrangian Line Search Function". _Optimization_ vol. 14, Iss. 2 (Jun. 1983): 197-216.*

Fuht, B., Greenberg, J., and Westwater, R. _Motion Estimation Algorithms for video Compression_. Boston: Kluwer Academic Publishers, Nov. 1997.*

(Continued)

*Primary Examiner*—Mehrdad Dastouri
*Assistant Examiner*—David N Werner
(74) *Attorney, Agent, or Firm*—Glenn Patent Group; Michael A. Glenn

(57) ABSTRACT

An encoder for encoding a video signal comprising a sequence of pictures, comprising a motion estimator for determining a motion estimation among the sequence of pictures, the motion estimation enabling a motion-compensated prediction of a pre-determined set of pictures of the sequence of pictures to obtain predicted pictures and residual data representing a deviation between the predetermined set of pictures and the predicted pictures, a parameter setter for setting parameters of an optimization problem based on the motion estimation and the predetermined set of pictures, and a solver for solving the optimization problem with the parameters being set, by means of convex optimization in order to yield optimized picture data that represents an encoded version of the residual data, is described. An improvement of the trade-off between rate and distortion is achieved by incorporating the motion estimation into the construction or set-up of the optimisation problem to be solved.

15 Claims, 6 Drawing Sheets

OTHER PUBLICATIONS

Chou, P., et al. Entropy-Constrained Vector Quantization. IEEE Transactions on Acoustics, Speech, and Signal Processing, vol. 37. No. 1. Jan. 1989.

Malvar, H., et al. Low-Complexity Transform and Quantization in H.264/AVC. IEEE Transactions on Circuits and Systems for Video Technology, vol. 13, No. 7. Jul. 2003.

Ortega, A., et al. Optimal Trellis-Based Buffered Compression and Fast Approximations. IEEE Transactions on Image Processing, vol. 3. No. 1. Jan. 1994.

Ramchandran, K., et al. Bit Allocation for Dependent Quantization with Applications to Multiresolution and MPEG Video Coders. IEEE Transactions on Image Processing, vol. 3 No. 5 Sep. 1994.

Schuster, G., et al. A Video Compression Scheme with Optimal Bit Allocation Among Segmentation, Motion, and Residual Error. IEEE Transactions on Image Processing, vol. 6. No. 11. Nov. 1997.

Shoham, Y., et al. Efficient Bit Allocation for an Arbitrary Set of Quantizers. IEEE Transactions on Acoustics, Speech, and Signal Processing, vol. 36. No. 9. Sep. 1988.

Wen, J., et al. Correspondence, Trellis-Based R-D Optimal Quantization in H.263+. IEEE Transactions on Image Processing, vol. 9. No. 8. Aug. 2000.

Wiegand, T., et al. Overview of the H.264/AVC Video Coding Standard. IEEE Transactions on Circuits and Systems for Video Technology, vol. 13. No. 7. Jul. 2003.

Wiegand, T., et al. Rate-Distortion Optimized Mode Selection for Very Low Bit Rate Video Coding and the Emerging H.263 Standard. IEEE Transactions on Circuits and Systems for Video Technology, vol. 6. No. 2. Apr. 1996.

Wiegand, T., et al. Text of ISO/IEC FDIS 14496-10: Information Technology—Coding of Audio-Visual Objects—Part 10: Advanced Video Coding. International Organisation for Standardisation. Mar. 31, 2003.

Wiegand, et al. Rate-Constrained Coder Control and Comparison of Video Coding Standards. IEEE Transactions on Circuits and Systems for Video Technology. vol. 13. No. 7. Jul. 1, 2003.

Joch, et al. Performance Comparison of Video Coding Standards Using Lagrangian Coder Control. Proceedings 2002 International Conference on Image Processing. ICIP 2002. Rochester NY. Sep. 22-25, 2002. International Conference on Image Processing. vol. 2.

Chuo-Ling, et al. Sender-Based-Rate-Distortion Optimized Streaming of 3-D Wavelet Video with Low Latency. Sep. 29, 2004. Multimedia Signal Processing. 2004 IEEE 6th Workshop on Siena, Italy. Sep. 29-Oct. 1, 2004. Piscataway, NJ.

Boyd, S., et al.; "Convex Optimization" Mar. 2004; Cambridge University Press.

Chen, M., et al.; "Rate-Distortion Optimal Motion Estimation Algorithm for Video Coding"; May 1996; IEEE; University of California, Los Angeles.

Everett, H.; "Generalized Language Multiplier Method for Solving Problems of Optimum Allocation of Resources"; May-Jun. 1963; Operations Research, vol. 11.

Lee, J., et al.; "Joint Optimization of Frame Type Selection and Bit Allocation for MPEG Video Encoders"; Nov. 1994; IEEE; Princeton University, Princeton, New Jersey.

Sullivan, G., et al.; "Rate-Distortion Optimized Motion Compensation for Video Compression Using Fixed or Variable Size Blocks"; Dec. 1991; Globecom 1991. University of California, Los Angeles.

The MOSEK Optimization Tools Version 3.2 (Revision 8). User's Manual and Reference. MOSEK ApS, Denmark; Jan. 2005.

* cited by examiner

FIGURE 5A
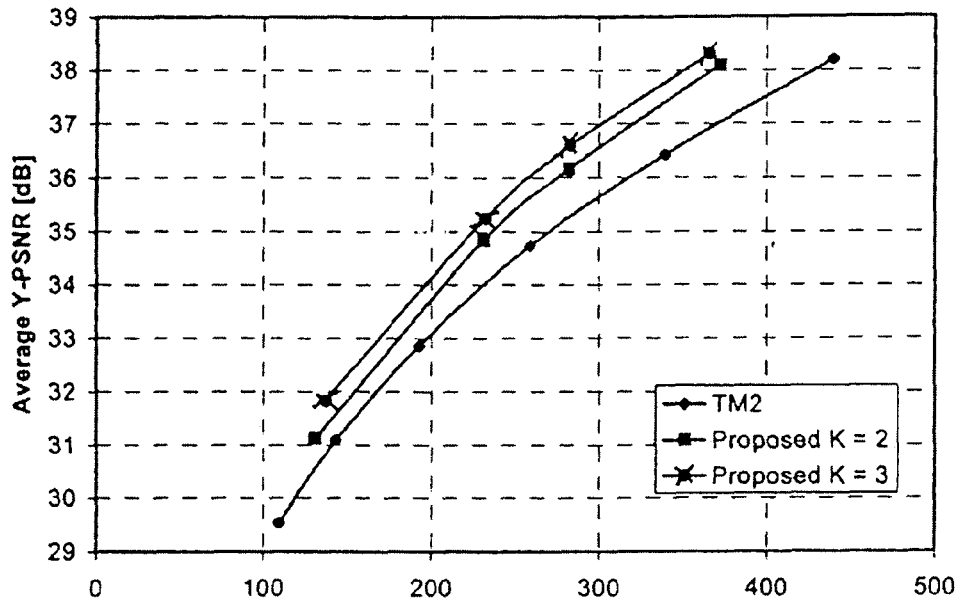
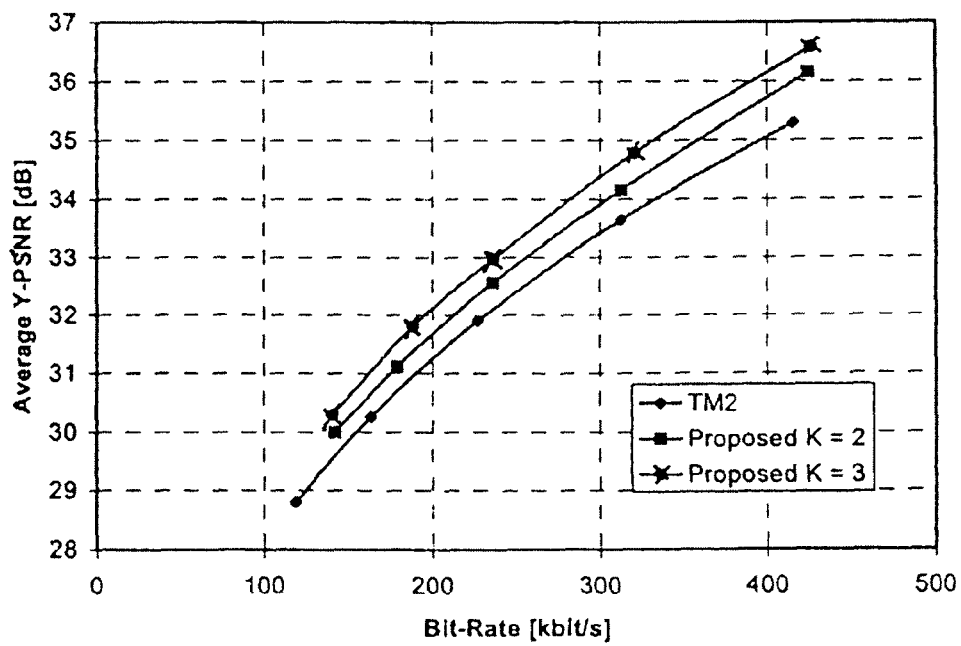
FIGURE 5B

FIGURE 6A
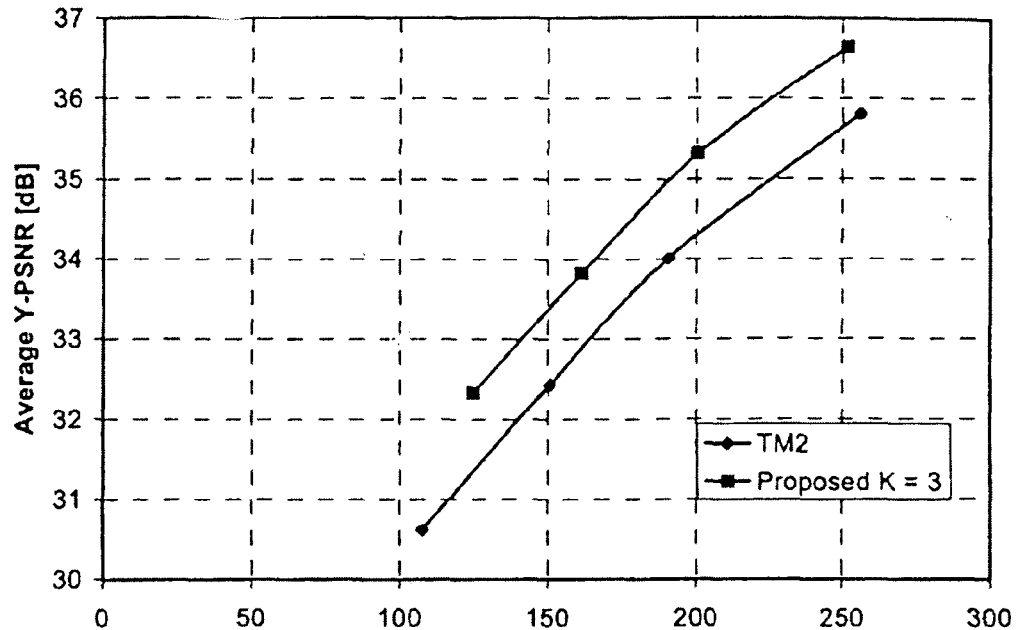
Flowergarden, IBPBP...
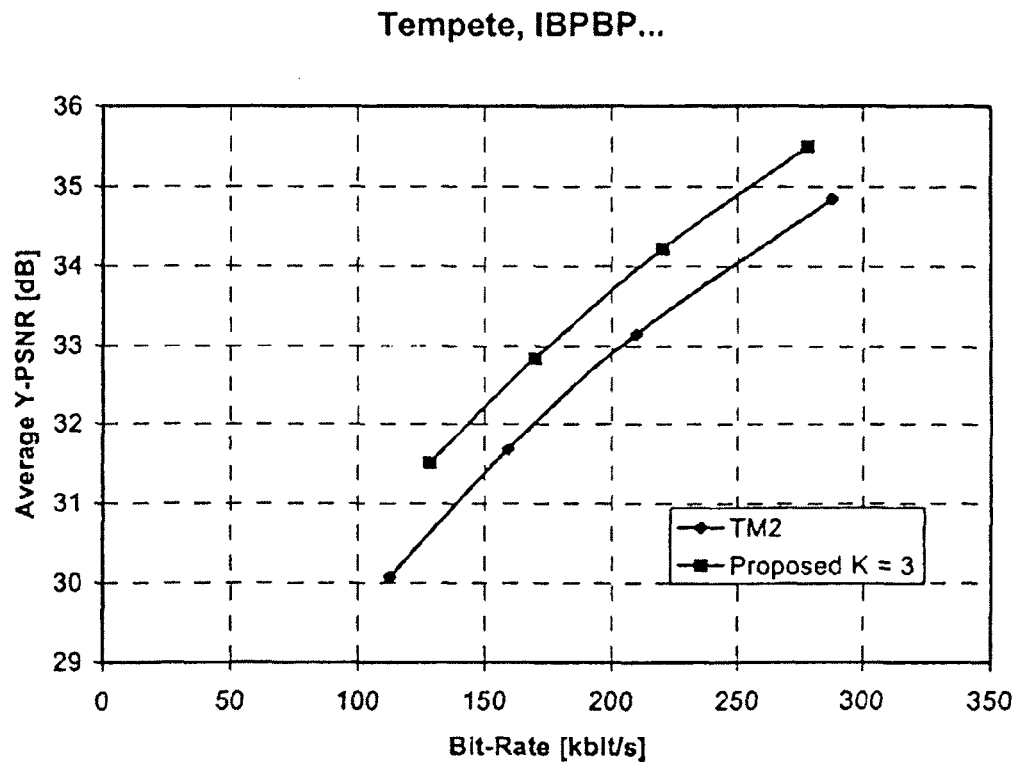
Tempete, IBPBP...
FIGURE 6B

APPARATUS AND METHOD OF OPTIMIZING MOTION ESTIMATION PARAMETERS FOR ENCODING A VIDEO SIGNAL

BACKGROUND OF THE INVENTION

1. Field of the Invention

The present invention relates to a method and an apparatus for encoding a video signal comprising a sequence of pictures and, in particular, to an improvement in hybrid codecs such as H.264/AVC including motion compensated prediction and coding of the prediction residual.

2. Description of Prior Art

The most successful class of video compression designs are called hybrid codecs such as H.264/AVC, described in ITU-T Recommendation H.264 & ISO/IEC 14496-10 AVC. Advanced Video Coding for Generic Audiovisual Services. 2003. Motion-compensated prediction and coding of the prediction residual are the fundamental building blocks of these codecs. The operation of a hybrid video encoder involves the optimisation of many decisions to achieve the best possible trade-off between rate and distortion given constraints on delay and complexity. Because of the use of motion-compensated prediction, all these decisions typically depend on each other for many pictures of a coded sequence.

There has been a large amount of work on optimisation problems in hybrid video coding in the past. One particular focus has been on Lagrangian optimisation methods. Such methods are described in: H. Everett III. Generalized Lagrange Multiplier Method for Solving Problems of Optimum Allocation of Resources. *Operations Research*, 11:399-417, 1963; Y. Shoham and A. Gersho. Efficient Bit Allocation for an Arbitrary Set of Quantizers. *IEEE Transactions on Acoustics, Speech and Signal Processing*, 36:1445-1453, September 1988"; P. A. Chou, T. Lookabaugh, and R. M. Gray. Entropy-Constrained Vector Quantization. *IEEE Transactions on Acoustics, Speech and Signal Processing*, 37(1):31-42, January 1989"; and G. J. Sullivan and R. L. Baker. Rate-Distortion Optimized Motion Compensation for Video Compression Using Fixed or Variable Size Blocks. In *Proc. GLOBECOM'* 91, pages 85-90, Phoenix, Ariz., USA, December 1991".

Work on considering the dependencies between the various encoding decisions has focused on modelling these dependencies by trellises which allows the use of dynamic programming methods. Bit-allocation to DCT coefficients was proposed by Ortega and Ramchandran for MPEG-2 Video in: K. Ramchandran, A. Ortega, and M. Vetterli. Bit Allocation for Dependent Quantization with Applications to Multiresolution and MPEG Video Coders. *IEEE Transactions on Image Processing*, 3(5):533-545, September 1994, and a version that handles the more complex structure of the entropy coding of H.263 has been developed in: J. Wren, M. Luttrell, and J. Villasensor. Trellis-Based R-D Optimal Quantization in H.263+. *IEEE Transactions on Circuits and System for Video Technology*, 1998. The selection of other coding parameters such as motion vectors and macroblock modes has been optimised in: A. Ortega, K. Ramchandran, and M. Vetterli. Optimal Trellis-Based Buffered Compression and Fast Approximations. IEEE Transactions on Image Processing, 3(1):26-40, January 1994"; T. Wiegand, M. Lightstone, D. Mukherjee, T. G. Campbell, and S. K. Mitra. Rate-Distortion Optimized Mode Selection for Very Low Bit Rate Video Coding and the Emerging H.263 Standard. IEEE Transactions on Circuits and Systems for Video Technology, 6(2): 182-190, April 1996; J. Lee and B. W. Dickinson. Joint Optimization of Frame Type Selection and Bit Allocation for MPEG Video Coders. In Proceedings of the IEEE International Conference on Image Processing, volume 2, pages 962-966, Austin, Tex., USA, November 1994; M. C. Chen and A. N. Willson. Rate-Distortion Optimal Motion Estimation Algorithm for Video Coding. In Proceedings of the IEEE International Conference on Acoustics, Speech and Signal Processing, volume 4, pages 2096-2099, Atlanta, Ga., USA, May 1996; and G. M. Schuster and A. K. Katsaggelos. A Video Compression Scheme with Optimal Bit Allocation Among Segmentation, Motion, and Residual Error. IEEE Transactions on Image Processing, 6(11):1487-1502, November 1997.

SUMMARY OF THE INVENTION

It is an object of the present invention to provide an encoder for encoding a video signal and a method for encoding a video signal which enable a better trade-off between rate and distortion.

In accordance with a first aspect of the present invention, this object is achieved by an encoder for encoding a video signal comprising a sequence of pictures, the encoder comprising a motion estimator for determining a motion estimation among the sequence of pictures, the motion estimation enabling a motion-compensated prediction of a predetermined set of pictures of the sequence of pictures to obtain predicted pictures and residual data representing a deviation between the pre-determined set of pictures and the predicted pictures; a parameter setter for setting parameters of an optimization problem based on the motion estimation and the predetermined set of pictures; and a solver for solving the optimization problem with the parameters being set, by means of convex optimization in order to yield optimized picture data that represents an encoded version of the residual data.

In accordance with a second aspect of the present invention this is achieved by a method for encoding a video signal comprising a sequence of pictures, comprising determining a motion estimation among the sequence of pictures, the motion estimation enabling a motion-compensated prediction of a pre-determined set of pictures of the sequence of pictures to obtain predicted pictures and residual data representing a deviation between the predetermined set of pictures and the predicted pictures; setting parameters of an optimization problem based on the motion estimation and the pre-determined set of pictures; and solving the optimization problem with the parameters being set, by means of convex optimization in order to yield optimized picture data that represents an encoded version of the residual data.

In accordance with a third aspect of the present invention this is achieved by a Computer program having instructions for performing, when running on a computer, a method for encoding a video signal comprising a sequence of pictures, comprising determining a motion estimation among the sequence of pictures, the motion estimation enabling a motion-compensated prediction of a predetermined set of pictures of the sequence of pictures to obtain predicted pictures and residual data representing a deviation between the predetermined set of pictures and the predicted pictures; setting parameters of an optimization problem based on the motion estimation and the pre-determined set of pictures; and solving the optimization problem with the parameters being set, by means of convex optimization in order to yield optimized picture data that represents an encoded version of the residual data.

The present invention is based on the finding that an improvement of the trade-off between rate and distortion may be achieved by incorporating the motion estimation into the construction or set-up of the optimisation problem to be solved.

In accordance with a preferred embodiment of the present invention the optimisation problem is formulated as a quadratic program for which efficient algorithms exist to find the optimal solution. In particular, in accordance with this embodiment, the optimisation problem is to find an optimal set of transform coefficient values minimizing a linear combination of distortion and bit-rate. As the distortion measure the mean squared error is used. The bit-rate is defined to depend on a sum or linear combination of the absolute values of the transform coefficient values.

Accordingly, an advantage of the preferred embodiment of the present invention is that the problem of selecting optimal transform coefficients over multiple frames or pictures is simplified to transform the problem from something that is intractable to something that can be solved, i.e. to a quadratic program. The solution to this tractable problem is then taken and tricks are done to recover a solution to the original problem. This solution may not be fully optimal, because of the transformation before and after the solution, but an enhancement in the trade-off between rate and distortion is achieved. To be more precise, the signal model of hybrid video coding is linearized with using a simplified rate model and assuming the motion estimation comprising motion vectors and quantization parameters to be fixed. The problem of selecting the transform coefficient values thus defined is written as a quadratic program.

Thus, an advantage of the preferred embodiment of the present invention is that the relationship between the transform coefficient levels and the decoded samples is expressed in order to arrive at a tractable formulation of the problem. A further advantage of this embodiment is that the selection of the transform coefficient values considers inter-frame dependencies that are introduced by motion compensation in hybrid video coding.

In order to avoid that the quadratic program solver returns optimal real-valued transform coefficient values or levels, although video encoding often requires integer transform coefficient levels, in accordance with the embodiment of the present invention, a subset of the transform coefficient levels is rounded and fixed, whereafter the quadratic program is resolved for the remaining unassigned transform coefficient levels. Another subset is then rounded and the process repeats until every coefficient has been assigned.

Very likely it is not possible to perform the optimization for the entire video sequence at once. Moreover, the resulting PSNR (Peak Signal-to-Noise Ratio) is much better for the first frame or picture than the subsequent frames or pictures for which the transform coefficient levels are optimized. Thus, in accordance with a further embodiment of the present invention, a sliding window is used where the quadratic program is solved to select coefficients for N frames or pictures, and then the coefficients for the first frame is kept while the coefficients for the subsequent frames 2 through N are discarded. Then, the procedure is repeated using frames 2 through N+1.

For higher performance, at the cost of encoding time, the motion estimation can be gradually improved within each group of N pictures. That is the invention can be used to encode pictures 1 and 2, then the motion estimation is recalculated for pictures 2 and 3, and the invention is used to calculate pictures 1 though 3. Next the motion estimation is recalculated for frames 2 through 4 and the transform coefficients are calculates for frames 1 though 4. This process is repeated until we have encoded frames 1 though N. Then the transform coefficients for frame 1 is saved and the above repeats to calculate 2 though N+1. This process repeats until entire sequence has been encoded.

In accordance with a further aspect of the present invention, the selection of motion estimation based on reconstructed frames is enabled by recalculating the motion estimation after each pass of the sliding window.

BRIEF DESCRIPTION OF THE DRAWINGS

In the following, preferred embodiments of the present invention will be described in more detail with reference to the accompanying drawings, in which:

FIGS. 5a and 5b show a graph in which PSNR is plotted versus bit-rate for the sequences Flowergarden (FIG. 5a) and Tempete (FIG. 5b) when using IPPP . . . coding with or without having an embodiment of the present invention implemented; and FIG. 6a and FIG. 6b show a graph in which PSNR is plotted versus bit-rate for the sequences Flowergarden (FIG. 6a) and Tempete (FIG. 6b) when using IBPBPBP . . . coding with or without implementing an embodiment of the present invention.

DESCRIPTION OF PREFERRED EMBODIMENTS OF THE INVENTION

Figure 3:
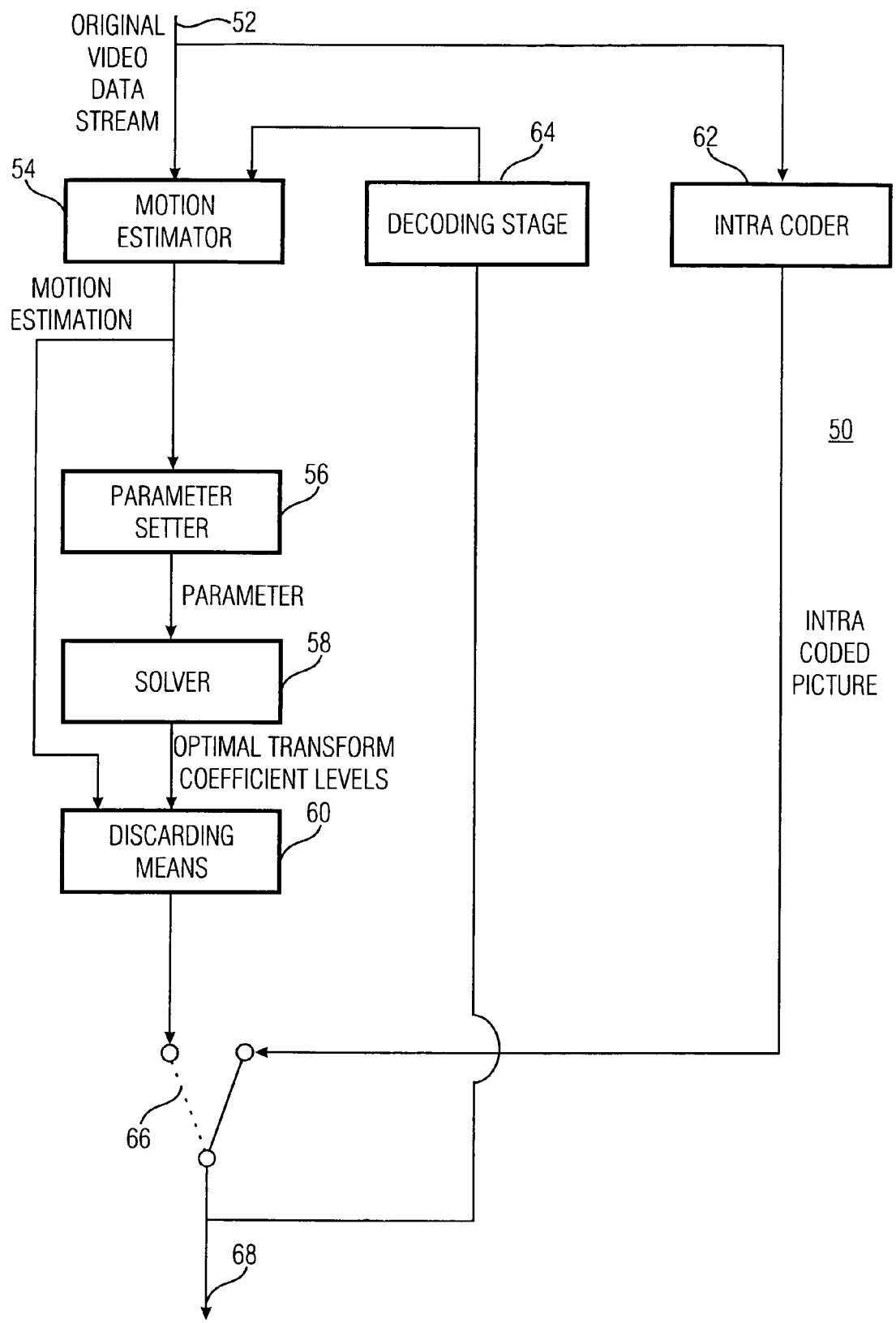
FIG. 3 shows a block diagram of a video encoder suitable for generating an encoded signal for the decoder of FIG. 2 in accordance with an embodiment of the present invention.
Figure 4:
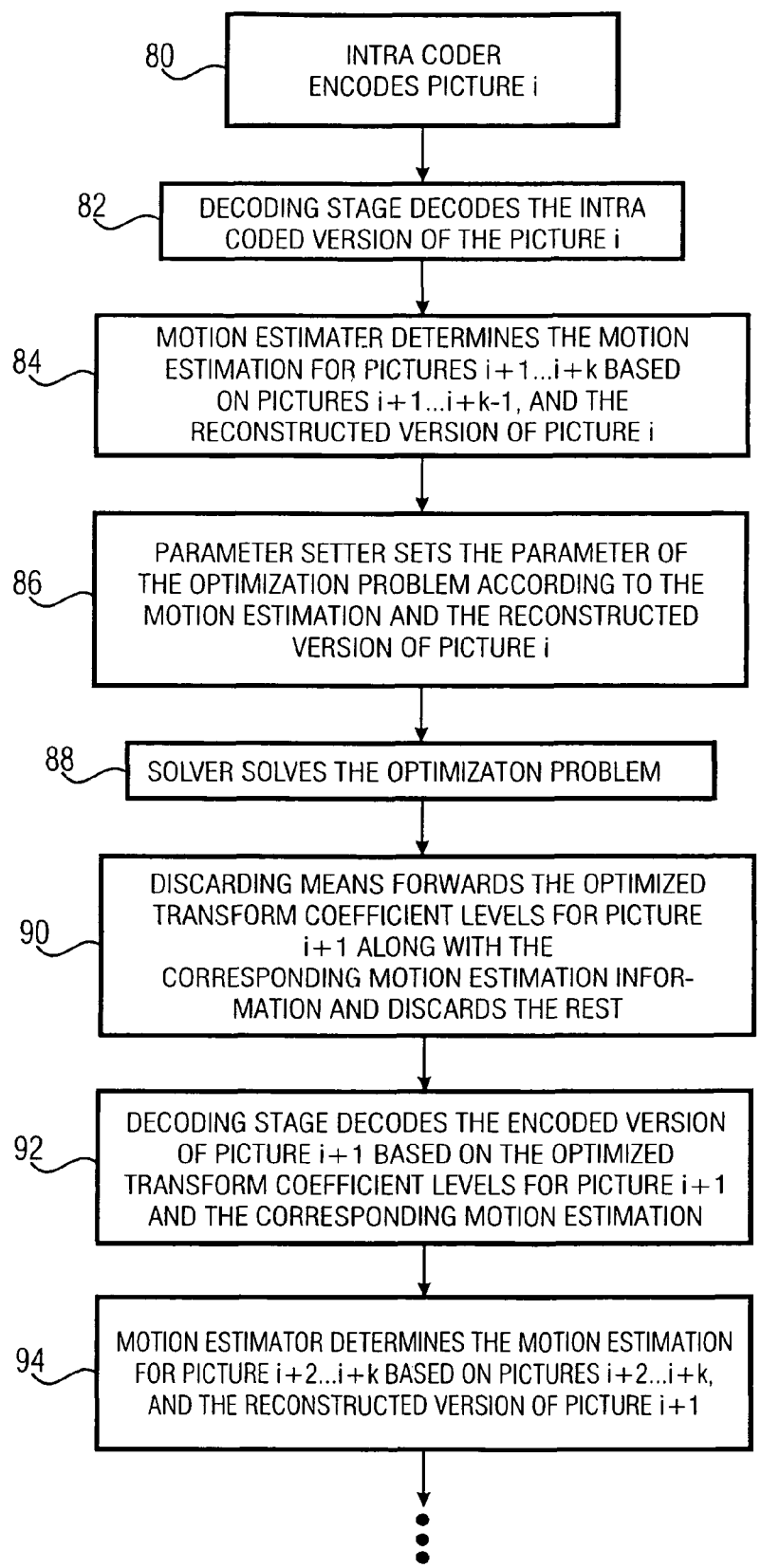
FIG. 4 a flow diagram of a portion of the steps performed by the encoder of FIG. 3 at the beginning of the encoding of a video sequence.

Before preferred embodiments of the present invention are described with respect to FIGS. 3 and 4 in detail, the following section provides basics useful for the understanding of these embodiments, wherefrom the advantages of the encoder of FIGS. 3 and 4 may be derived.

Consider the encoding process of a hybrid video encoder such as H.264/AVC as described in ITU-T Recommendation H.264 & ISO/IEC 14496-10 AVC. Advanced Video Coding for Generic Audiovisual Services. 2003; and T. Wiegand, G. J. Sullivan, G. Bjontegaard, and A. Luthra. Overview of the H.264/AVC Video Coding Standard. IEEE Transactions on Circuits and Systems for Video Technology, 13(7):688-703, July 2003. Let's assume that the motion vectors and quantization parameters are already determined for the entire sequence. The first picture is coded as an intra picture and all other parts of the remaining pictures are coded using motion-compensated prediction. The task that remains for the encoder is to determine the transform coefficient levels that represent the residual signal in order to optimize some cost function of image fidelity and bit-rate. A common technique is to use a Lagrangian formulation and to minimize a linear combination of distortion and bit-rate, $D+\lambda R$ as described in Y. Shoham and A. Gersho. Efficient Bit Allocation for an Arbitrary Set of Quantizers. IEEE Transactions on Acoustics, Speech and Signal Processing, 36:1445-1453, September 1988; and P. A. Chou, T. Lookabaugh, and R. M. Gray. Entropy-Constrained Vector Quantization. IEEE Transactions on Acoustics, Speech and Signal Processing, 37(1):31-

42, January 1989. The most common distortion measure is the mean squared error, which we also use. The bit-rate is typically a rather complicated function R(c) of the quantized transform coefficient levels c.

Figure 1:
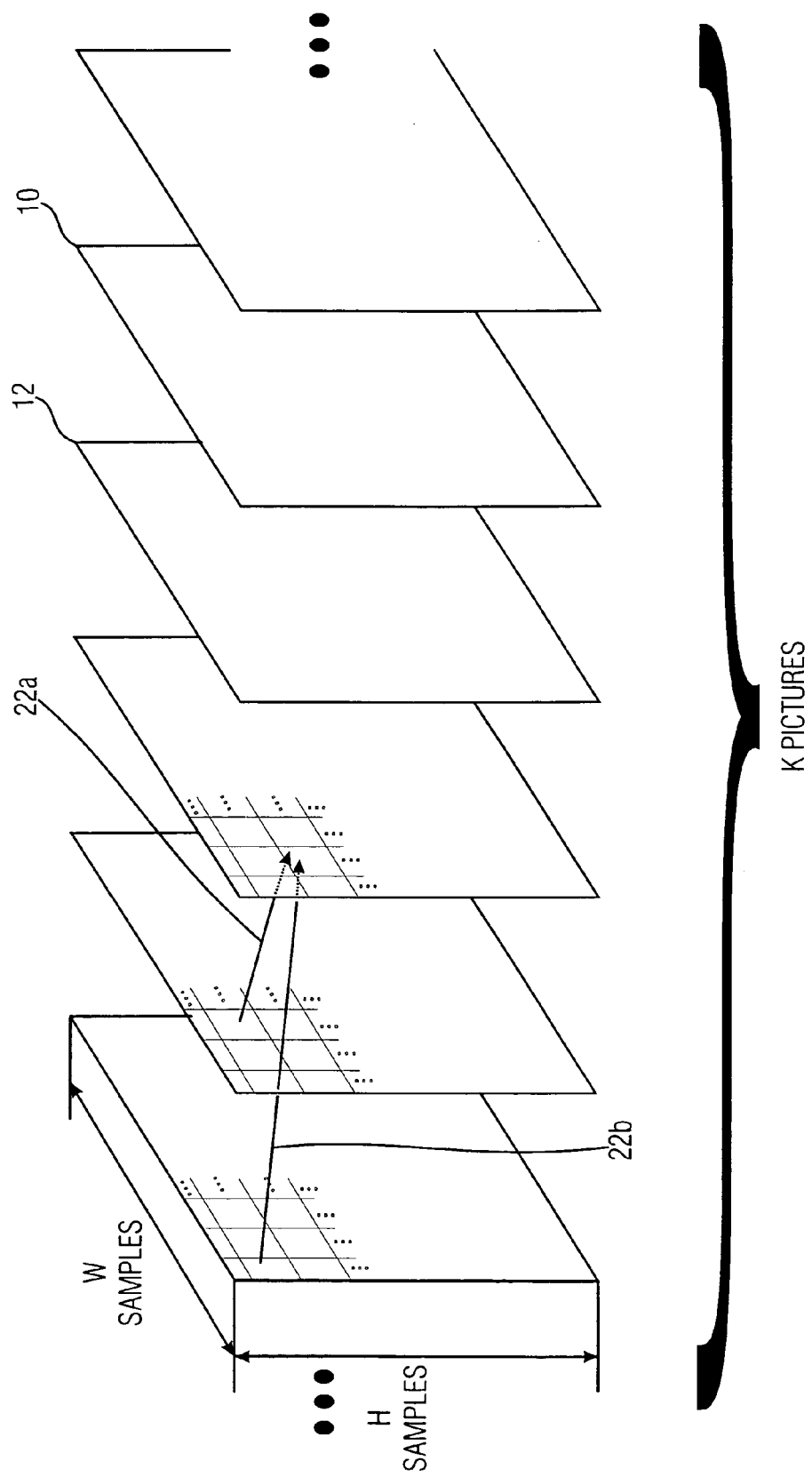
FIG. 1 shows a schematic diagram illustrating a portion of a video signal comprising a sequence of frames or pictures and motion vectors for motion compensated prediction.

To make this clearer, let's assume the encoding of a video sequence as shown in FIG. 1, the video sequence being indicated by 10 and having K pictures 12 of width W and height H samples with a dynamic range of A=(0.255) and let N=K·W·H be the number of samples. The vector v∈$A_N$ represents the original N sample values with $v_i$ being the i'th sample value. Let s(c)∈$A^N$ represent the reconstructed sample values after decoding with $s_i$ being the i'th decoded sample value corresponding to $v_i$. Hence the problem of selecting transform coefficient levels c can be written as:

$$\text{Minimize}\{(v-s(c))^T(v-s(c))+\lambda R(s,c)\} \quad (1)$$

Note that the dependencies of s and R on c are at the center of our investigations. Let $S_B$ be the decoded samples for the current block B and $C_B$ be the transform coefficient levels for the block B.

All previous publications on transform coefficient optimization as described in the above articles "Bit Allocation for Dependent Quantization with Applications to Multi-resolution and MPEG Video Coders" of Ramchandran et al. and "Trellis-Based R-D Optimal Quantization in H.263+" of Wen J. et al., only considered the choice of $C_B$ to have an impact on $S_B$ with regard to distortion or bit-rate. The impact on other blocks was ignored.

Moreover, many encoding algorithms, such as described in: "H. S. Malvar, A. Hallapuro, M. Karczewicz, and L. Kerofsky. Low-Complexity Transform and Quantization in H.264/AVC. IEEE Transactions on Circuits and Systems for Video Technology, 13(7):598-603, July 2003" determine the transform coefficient levels $c_i$ of a block ignoring the dependency of R on $C_B$ by simple quantization of the associated transform coefficient levels $t_i$ according to $$c_i = sgn(t_i) * \lfloor (|t_i| + f*q)/q \rfloor \quad (2)$$

with q being the quantization step size, f being the dead-zone control parameter, $\lfloor \ \rfloor$ indicating the rounding to the next lower integer, and sgn(a) being a function outputting 1 when a is positive and −1 when a is negative. But this way of obtaining the levels is optimal only with respect to mean square error distortion measure (which we also use for our work) measured between the original and reconstructed samples for the current block. The impact of the introduced quantization error on samples referring to this block by motion compensation is not considered.

As came out from the above considerations, the problem to be solved is represented by (1). However, in order to ease the understanding of the special challenges arising with respect to the hybrid codecs, an example of a decoder for decoding an encoded video signal being encoded by means of motion-compensated prediction is described with respect to FIGS. 1 and 2.

Figure 2:
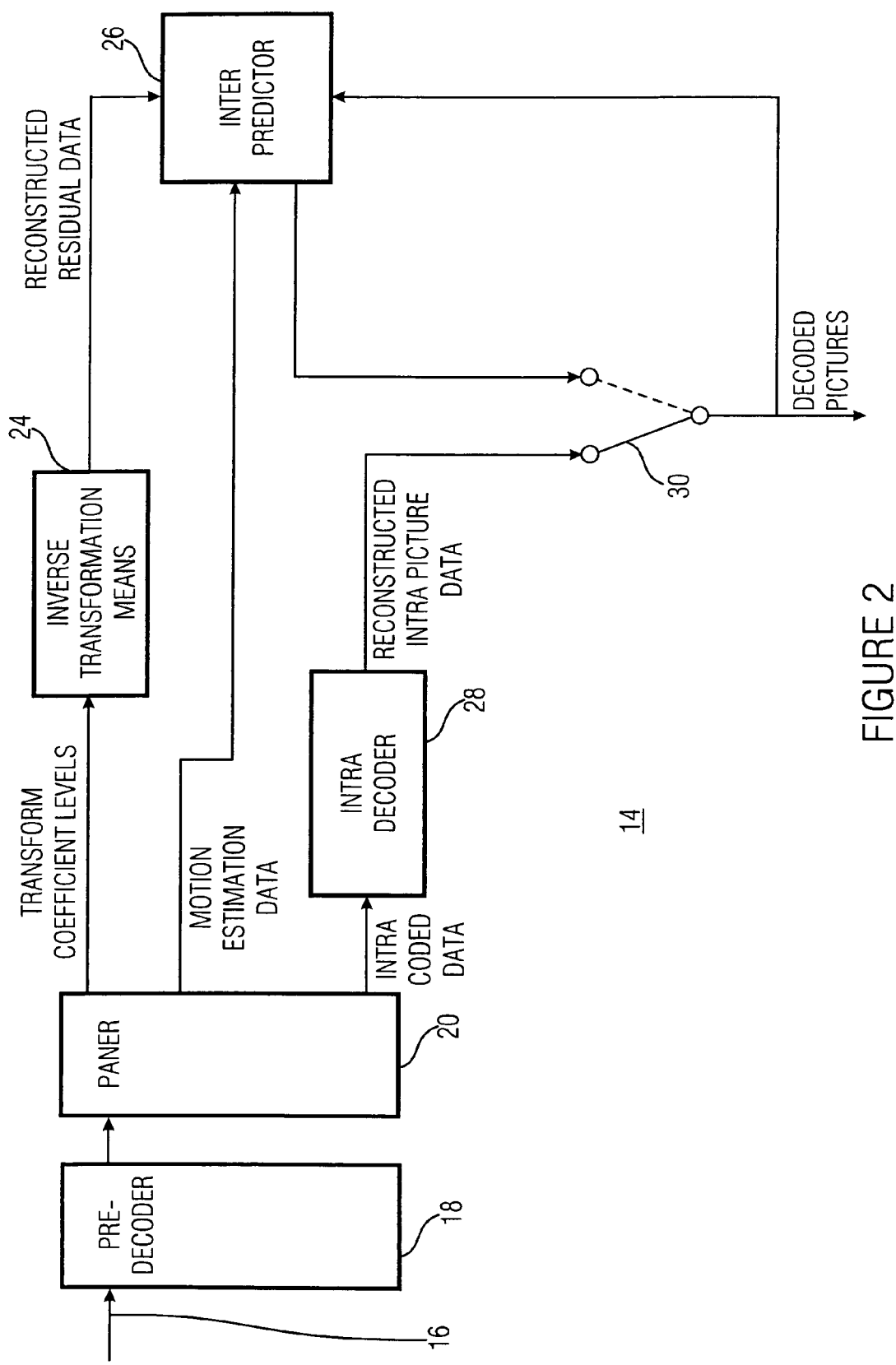
FIG. 2 shows a block diagram of a decoder for decoding a video signal encoded by means of motion-compensated prediction.

The decoder 14 of FIG. 2 has an input 16 for receiving the encoded video signal. The encoded video signal contains encoded syntax elements. The syntax elements are encoded by means of an arithmetic or Huffman encoding scheme, for example. Decoder 14 has an input of a predecoder 18 connected with input 16 in order to transform the encoded syntax elements into decoded syntax elements and to forward the latter ones to a parser 20.

The decoded syntax elements represent an encoded version of the video sequence comprising, for example, the K pictures of FIG. 1. Among others, the syntax elements may be divided up into inter-coded data, motion estimation data, and transform coefficient levels. Inter-coded data represents an encoded version of one picture of the video sequence. In contrast to inter-coded data, intra-coded data enables the reconstruction of the respective intra-picture without the need for any other information, such as picture samples of a reference picture. In other words, intra-coded data is separately decodable or self-contained, and no additional information is necessary in order to enable reconstruction of the picture encoded by the intra-coded data.

Not all pictures of the sequence 10 of pictures are intra-coded. Rather, it is assumed that the K pictures shown in FIG. 1 succeed an intra-coded picture and are themselves inter-coded. For all these inter-coded pictures, the encoded data stream at input 16 contains motion estimation data as well as transform coefficient levels. The motion estimation data for a certain picture may comprise a motion vector field along with corresponding reference picture information and block mode selection information, for example. The motion vector field comprises several motion vectors. Two examples of such motion vectors are illustrated in FIG. 1 at 22a and 22b. A motion vector is a two-dimensional vector that provides an offset between the coordinates in a reference picture as indicated by the reference picture information, on the one hand, and the coordinates in the respective interceded picture. There are more than one motion vector per inter-coded picture. Rather, motion vectors are assigned to each block of a picture 12, each block having a certain block size. The block size and the division of the picture 12 into blocks depends on the block mode selection information. An exemplary division into blocks is illustrated in FIG. 1 in the first three pictures shown in FIG. 1. The accuracy of motion compensation may be in units of samples or in units of one half or one quarter of the distance between the picture samples, for example. In case the motion vector points to an integer-sample position, the samples of the reference picture offset by the corresponding motion vector themselves form a prediction signal for the inter-coded picture of interest. In case of a motion vector pointing to intermediate positions, the prediction signal may be obtained by use of an interpolation to generate non-integer positions. In case of the H.264/AVC standard, for example, the prediction values at half-sample positions are obtained by applying a 1-dimensional 6-tap FIR filter horizontally and vertically, and prediction values at quarter-sample positions are generated by operating samples at integer- and half-sample positions. For further information, reference is made to the above-mentioned article "Overview of the H.264/AVC video coding standard" section H.1 of which is incorporated herein by reference.

As illustrated in FIG. 1, reference pictures are not necessarily the picture immediately preceding the inter-coded picture of interest. Moreover, for completeness only, it is noted that more than one reference picture may be used for predicting the value of a certain sample of an inter-coded picture, the prediction signal then being the average of both predictors, for example.

Summarizing, motion estimation data enables motion-compensated prediction of pictures so that the prediction signal is not equal to the reference picture but to an offset version of the reference picture in which the picture samples of the reference picture are offset as indicated by the motion vectors. The advantage of motion-compensated prediction over normal time-prediction among consecutive frames is that the residual data, i.e. the difference between the predicted picture and the reference picture, can be made smaller so that a higher compression ratio may be achieved.

Motion estimation data enables the decoder 14 to predict the picture actually to be decoded in the same way as the encoder did. The transform coefficient levels, in turn, provide the prediction residual which is to be added to the prediction signal in order to yield the reconstructed picture.

Accordingly, decoder 14 comprises an inverse transformation means for receiving the transform coefficient levels from parser 20 and performing an inverse transformation on these levels in order to yield reconstructed residual data. In particular, the inverse transformation means 24 performs a block-wise transformation on the transformation coefficient levels such that each transformation of a set of transform coefficient levels results in a block of residual samples corresponding to a block of the inter-coded picture currently to be decoded. It is noted that the division of a picture into transformation blocks may deviate from the division of the picture into motion estimation blocks.

An inter-predictor 26 receives the reconstructed residual data representing the reconstructed picture from means 24 and the motion estimation data from parser 20 and adds the reconstructed residual data to a motion-compensated prediction, which the inter-predictor 26 derives from the motion estimation data as described above. The result of the inter-prediction represents a reconstruction of an inter-coded picture.

Moreover, decoder 14 comprises an intra-decoder 28 for decoding the intra-coded picture data. The reconstructed inter-picture data output by intra-decoder 28 and the reconstructed inter-picture data output by intrapredictor 26 are combined at a switch 30 to form a data stream representing the decoded pictures. This data stream is also input to intrapredictor 26, which needs the already decoded or reconstructed pictures in order to yield the motion-compensated prediction by use of the motion estimation data. In particular, the inter-predictor offsets the reconstructed references pictures by use of the motion estimation data in order to yield the prediction data.

Referring back to the above introduction, the embodiments described below focus on finding an optimized set of transform coefficient levels for coding the prediction residual of the K pictures 12 coded using motion-compensated prediction. A non-optimal selection of a certain transform coefficient level not only has an impact on the video fidelity in the respective transformation block but also on the compression rate for neighbouring blocks in succeeding pictures, for example, due to the poorer motion-compensated prediction quality. Therefore, the bit allocation problem to transform coefficients in hybrid video coding is formulated in the following as a quadratic program allowing to consider the impact of the selection of a particular transform coefficient when being referenced in motion-compensating other samples. The strategy of selecting transform coefficient levels considering intra-frame dependencies that are introduced by motion compensation in hybrid video coding as described below uses a linear model of the dependencies between frames and a simplified rate model that enables to calculate nearly-optimal transform coefficient levels via a quadratic program. Simulation results using the video coding standard H.264/AVC show coding gains of up to 1.4 dB in comparison to the quantization strategy specified in the test model of H.264/AVC.

Before describing an encoder in accordance with an embodiment of the present invention with respect to FIGS. 3 and 4 in detail, the following discussion explains how the above problem expresses in (1) is formulated in order for the encoder to yield an optimized set of transform coefficient levels.

Firstly, the signal model underlying a hybrid video codec has to be derived, an example for a decoder of the hybrid codec type having been described with respect to FIGS. 1 and 2.

Fairly accurately, a decoded sample $s_i$ can be represented as a linear combination of previously decoded samples, the corresponding residual sample, and a static predictor. Hence, a linear model for s (bold written small letters indicate vectors, whereas bold written capital letters indicate matrices) as a signal equation can be written as follows:

$$s = \hat{s} + u + p = Ms + Tc + p \quad (3)$$

As noted above, the N×1 vector s is a column vector containing all decoded samples of the pictures that are jointly optimized. The N×N matrix M expresses the motion compensation, i.e., mapping the decoded sample $s_j$ onto the decoded sample $s_i$. Accordingly, ŝ represents a vector the entries of which correspond to the prediction data for motion-compensated prediction of the pictures. The rows of the N×N matrix T provide inverse scaling and transform of the transform coefficient levels c in order to obtain the decoded residual signal u. The column vector p is a static predictor which represents motion-compensated prediction samples referencing decoded samples that are not part of the vector s. The construction of M, T, c, and p is described in detail below.

The matrix M is constructed using the motion vectors and reference picture indices that are pre-determined by the motion estimation process. The values in the row $m_i$ of M express how each decoded sample in s contributes to the motion-compensated prediction sample for $s_i$. For example, let's assume the prediction sample $s_i$ is motion-compensated with integer-sample accuracy referencing the sample $s_z$. Then $m_{iz}=1$ and $m_{ij}=0 \forall j \neq z$. In a more complicated example, assume that the prediction sample for $s_i$ is the result of ½ pixel motion estimation, where the H.264/AVC 6-tap filter must be applied. In this case, there are 6 non-zero entries in $m_i$, [1 −5 20 20 −5 1]/32. The indices of these non-zero entries depend on the motion vector, the reference picture index for motion compensation and the position of the current sample. Note that $m_i$ could have 36 non-zero entries if the ½ pixel filter must be applied twice to construct the prediction sample. If B-frames are used, $m_i$ could have up to 72 non-zero entries. Note that we are ignoring any rounding in the description of fractional-sample interpolation.

The matrix T is constructed using the 4×4 inverse transform and the inverse scaling equations of H.264/AVC. Let $s_B$ be a 4×4 block B of decoded samples. Ignoring rounding, the residual samples for $u_B$ that are used to obtain $s_B$ are given by a linear combination of 16 transform coefficient levels in $c_B$. The weights in this linear combination are determined by the inverse transform used, the position of the residual sample within B, the position of the transform coefficient level within B, and quantization parameter for B. Note that the non-zero entries of T are located according to the ordering of the $c_i$ relative to the positions in the pictures.

The vector p contains the motion-compensated prediction signal for samples whose prediction depends on samples outside of the K frames currently being optimized. For example, the intra picture is currently not optimized by our algorithm and its samples are therefore outside the vector s. The contribution of these intra samples to the values of all samples in s is expressed after motion-compensating them towards each s.

Given the signal model for hybrid video decoding in (3), the minimization problem in (1) for transform coefficient level selection is as follows $$\text{minimize } \{(v-s)^T(v-s)+\lambda R(v,c)\} \quad (4)$$

$$\text{subject to } s=Ms+Tc+p \quad (5)$$

Except for the functional relationship between R and c, this is very close to a quadratic program. A quadratic program is a problem of the form $$\text{minimize } \{x^T H x + f^T x\} \quad (6)$$

$$\text{subject to } Ax = b$$

$$Ex \leq g$$

where x is a column vector of real variables and $x^T H x$ is a convex function in x. The advantage of having our problem in the form of a quadratic program is that efficient algorithms exist to find the optimal x. Furthermore, the core of these algorithms involve solving a series of linear equations. Because of the very large dimensions of M and T, including the fact that these are extremely sparse, only linear systems are tractable solutions to our problem on today's computers.

Note that the actual bit-rate is a very complex function of c. However, transform coefficient levels with a smaller absolute value almost always result in a smaller rate. Therefore, in order to obtain a piece-wise linear approximation of R(c), we use $$R(c) \approx \sum_i \max(0, |c_i| - \hat{w}) \quad (7)$$

The reason for the introduction of the integer scaler $\hat{w} \in A$ will be explained in the next section and $\hat{w}$ can be assumed for now to be equal to 0. We make our problem a quadratic program by allowing s, $c \in \mathbb{R}^n$ and introducing another variable $r \in \mathbb{R}^n$ such that $r_i \geq |c_i| \forall i$. Our problem is now:

$$\text{Minimize } s^T s - 2s^T v + \lambda 1^T r \quad (8)$$

$$\text{subject to } s = Ms + Tc + p$$

$$r \geq c - \hat{w}1$$

$$r \geq -c - \hat{w}1$$

$$r \geq 0$$

where 1 is a vector with every entry equal to one, 0, is a vector with every entry equal to zero, and our variables are s, c, and r. It can be shown that the above formulation can be mapped into the quadratic program formulated in (6). Having formulated the problem of selecting transform coefficient levels as a quadratic program, and having arrived at the optimization problem in (8), the mapping into the standard form of a quadratic program (6) is given by the following equations.

$$x = \begin{bmatrix} s \\ c \\ r \end{bmatrix} \quad (9)$$

$$H = \begin{bmatrix} I & 0 & 0 \\ 0 & 0 & 0 \\ 0 & 0 & 0 \end{bmatrix} \quad (10)$$

$$f = \begin{bmatrix} -2v \\ 0_N \\ \lambda 1_N \end{bmatrix} \quad (11)$$

$$A = [I - M \quad -T \quad 0] \quad (12)$$

$$b = p \quad (13)$$

$$g = \begin{bmatrix} -\hat{w}1_N \\ -\hat{w}1_N \\ 0_N \end{bmatrix} \quad (14)$$

$$E = \begin{bmatrix} 0 & I & -I \\ 0 & -I & -I \\ 0 & 0 & -I \end{bmatrix} \quad (15)$$

where 0 is the N×N all zero matrix, I is the N×N identity matrix, $0_N$ is a N×1 column vector of all zeros, and $1_N$ is a N×1 column vector of all ones.

Solving the above problem (8) by means of a quadratic program solver, such as MOSEK as described in: MOSEK ApS. The MOSEK optimization tools version 3.1 (Revision 28) User's manual and reference. MOSEK ApS, Copenhagen, Denmark, 2002, results in optimal real-valued values for the unknown variables. However, the transform coefficient levels should be integer valued. The simplest heuristic would be to round each non-integer $c_i$ to the nearest integer. Although this yields a reasonable result for c, the reconstructed samples based on integer valued c are different than those from the real valued c. Thus the resulting PSNR is very likely to be lower than the above algorithm calculated it would be. This is somewhat ameliorated by rounding only a subset of c, adding the effect of the determined elements of c into the static predictor p, removing the unneeded columns of T, and then resolving (8) with the now smaller problem. This gives the quadratic program solver a chance to take the rounding into account for the remaining unknowns of c, which is especially helpful for the unknowns of c in the same 4×4 blocks as the determined and rounded elements of c. We repeat this process until all of c has been rounded.

The iterative algorithm may be described by the following pseudo program code. Note, that $t_i$ is the ith column of T.
step 0: Initialize w=δ
step 1: Set $\hat{w}=\lfloor w \rfloor$
step 2: Solve (8) obtaining non-integer valued elements in c
step 3: For all c≦w, $\hat{c}_i=\lfloor c_i+0.5 \rfloor$, remove $t_i$ from T, and update p=p+$\hat{c}_i t_i$
step 4: For all c>w, assign them to c
step 5: Set w=w+Δ
step 6: If c is not empty, go to step 1, otherwise stop When the algorithm is finished c is empty, and the solution to the problem in (8) is in ĉ with elements $\hat{c}_i$ Conceptually, we are solving for the transform coefficient levels whose value is equal to $\hat{w}=\lfloor w \rfloor$ each time. Our rate function acts as a penalty function on $\Sigma |c_i|$. The $\hat{w}$ in the rate function adds a "free" zone for cis less than $\hat{w}$. This type of penalty function in a quadratic program tends to have solutions with a relatively large number of $c_i$s at ŵ desired. In this regard reference is made to S. Boyd and L. Vandenberghe. Convex Optimization. Cambridge University Press, Cambridge, United Kingdom, 2004.

The choice of δ and Δ is a trade-off between computation time and coding efficiency. We found that δ=0.5 and Δ=1.0 provides large gains over the simple rounding case with a small increase in coding time (as the quadratic problems drastically decrease in size with each iteration).

For almost all practical video sequences, it is computationally infeasible to optimize the entire sequence simultaneously. Hence, we employ the following sliding window heuristic. Regardless of the length of the sequence to be optimized, we run the iterative algorithm for frames 1 though K. Then the portion of c corresponding to the first encoded frame is kept, while the rest is discarded. We then run the iterative algorithm for frames 2 though K+1. This is repeated until the complete sequence is encoded.

The above explanation mainly concentrated on the mathematical basics necessary to understand the preferred embodiments of the present invention. In the following, an encoder in accordance with an embodiment of the present invention is described with respect to FIGS. 3 and 4. FIG. 3 illustrates the internal arrangement of the encoder, while FIG. 4 illustrates the mode of operation of the encoder of FIG. 3 during encoding, for example, the K pictures of FIG. 1 immediately succeeding an intra-coded picture.

The encoder of FIG. 3 is indicated with reference number 50 and comprises an input 52 receiving the original video data stream, a motion estimator 54 for motion estimation, a parameter setter 56 for setting the parameters in the optimization problem to be solved, a solver 58 for solving the parameterized optimisation problem, a discarding means 60 for forwarding a part of the optimal transform coefficient levels output by solver 58 and discarding the rest, an intra-coder 62 for intra-coding intra-coded pictures in the original video data stream, a decoding stage 64 for decoding the resulting encoded video data stream composed of the output of the discarding means 60 and the inter-coder 62 by means of a switch 66 in an intermittently arranged manner, and an output 68 for outputting the resulting encoded video data stream.

An input of the motion estimator 54 and an input of the inter-coder 62, respectively, is coupled to the input 52. An output of motion estimator 54 is connected to an input of the parameter setter 56 and an input of discarding means 60, respectively. Solver 58 is connected between an output of parameter setter 56 and an input of discarding means 60. Switch 66 is connected between the output of discarding means 60 and the output of inter-coder 62, on the one hand, and output 68, on the other hand, thereby enabling the composition of the encoded video data stream of intra-coded pictures as well as motion-compensated predicted pictures in an interlocking manner. Decoding stage 64 is connected between the output 68 and a further input of motion estimator 54.

After having described the arrangement of encoder 50, its operation is described with respect to FIG. 4, wherein it is assumed that picture i in the original video data stream is an intra-coded picture, whereas the following K pictures i+1 ... i+K such as those shown in FIG. 1, for example, are pictures coded by means of motion-compensated prediction.

In step 80, picture i is encoded by intra-coder 62. The result is an intra-coded version of picture i that passes switch 66 to reach output 68 as a part of the final encoded or precoded data stream, and the input of decoding stage 64. A final encoder corresponding to the precoder 18 at the side of the decoder could be arranged immediately preceding the output 68 in order to further encode or compress the syntax elements of the intra-coded version before their output. However, this final encoding stage is neglected in FIG. 2 for illustrating purposes.

At step 82, decoding stage 64 decodes the intra-coded version of picture i to yield a reconstruction of picture i. In effect, decoding stage 64 simulates decoder 14 of FIG. 2 except predecoder 18. Therefore, an internal arrangement of decoding stage 64 could be equal to the arrangement of modules 20 to 30 in FIG. 2.

At step 84, motion estimator 54 determines the motion estimation for pictures i+1 ... i+K. For simplification reasons, it is assumed that the motion estimator 54 performs a motion estimation merely among immediately consecutive pictures. However, it is emphasized that the following description is easily convertible to other motion estimation schemes. In accordance with the afore mentioned assumption, the motion estimator 54 determines the motion estimation based on the reconstruction of picture i and the following pictures i+1 ... i+K−1. In particular, the motion estimator 54 determines the motion estimation for picture i+1 based on the reconstruction of picture i. For the remaining pictures i+2 ... i+K, the motion estimator 54 uses the original pictures i+1 ... i+K−1. In particular, the motion estimator 54 determines the motion estimation for picture i+2 based on picture i+1, the motion estimator for picture i+3 based on picture i+2 and so on. The motion estimator 54 outputs the motion estimation for pictures i+1 ... i+K along with the reconstruction of picture i to the parameter setter 56.

In step 86, parameter setter 56 sets the parameters of the optimization problem according to the motion estimation and the reconstructed version of picture i as output by motion estimator 54. To be more precise, parameter setter 86 constructs matrix M depending on the motion estimation received from motion estimator 54. Moreover, parameter setter 56 constructs vector p depending on the motion estimation for pictures whose motion-compensation prediction depends on samples outside the K frames currently being optimized, i.e. outside pictures i+1 ... i+K. To be even more precise, with the above assumption of the motion estimation being restricted to involve merely immediately consecutive pictures, the parameter setter 56 sets the entries of vector p corresponding to picture i+1 to be equal to the motion-compensated prediction signal for picture i+1 which depends on intra-coded picture i as described above with respect to step 84, and sets the other entries of p to be zero. Lastly, the parameter setter 56 sets vector v in accordance with the samples of pictures i+1 ... i+K which are also forwarded by motion estimator 54 to parameter setter 56.

Thereafter, in step 88, the solver 58 solves the optimisation problem being parametrized by parameter setter 56 and being formulated in the form of (6) and (9) to (15), this quadratic program being equivalent to the problem as formulated in (4) and (5). In other words, solver 58 determines an optimized set of variables s, c, and r such that the minimum requirement and the constraints defined in (6) are fulfilled, thereby concurrently fulfilling (4) and (5). As mentioned above, any quadratic program solver may be used for solver 58, such as MOSEK.

In step 90, discarding means 60 receives the optimized transform coefficient levels c from solver 58. Preferably, the optimized transform coefficient levels are integer valued. This could be achieved by implementing the solver 58 with the iterative algorithm including steps 0 to 6 as described above. Moreover, the discarding means 60 receives the motion estimation for the currently optimized pictures i+1 ... i+K. Among this data, discarding means 60 chooses the optimal transform coefficient levels for the first picture of the currently optimized pictures, i.e. picture i+1, along with a corresponding motion estimation for this picture i+1, and forwards this information to switch 66. The rest is discarded. The switch 66 forwards the information for picture i+1 to the output 68 as part of the resulting encoded video data stream, as well as to the input of decoding stage 64.

At step 92 decoding stage 64 decodes the encoded version of picture i+1 based on the optimized transform coefficient levels for picture i+1 and the corresponding motion estimation data for this picture. In effect, and referring to FIG. 2, decoding stage 64 performs an inverse transformation on the optimized transform coefficient levels, deduces a motion-compensated prediction signal from the motion estimation data and combines, e.g. adds, the reconstructed residual data resulting from the inverse transformation with the prediction signal in order to yield the reconstruction of picture i+1 and forward same to motion estimator 54.

At step 94, the sliding window is moved from pictures i+1 ... i+K to i+2 ... i+K+1, and steps 84 to 92 are performed again for the new sliding window, i.e. with I incremented by one. The number of repetitions depends on the size of the hole video sequence. The repetition is performed until the complete sequence is encoded.

An encoder using the above quadratic program has been tested in a form generating an encoded bit stream in accordance with the video coding standard H.264/AVC. The results verify the efficiency of the above approach. In particular, in the experiments conducted, a video codec was used that conforms to H.264/AVC. The motion estimation and the quantization parameter were fixed. Motion estimation was conducted using the Lagrangian approach as described in T. Wiegand, H. Schwarz, A. Joch, F. Kossentini, and G. J. Sullivan. Rate-Constrained Coder Control and Comparison of Video Coding Standards. IEEE Transactions on Circuits and Systems for Video Technology, but using original reference pictures.

The Lagrange parameter was also chosen according to the just mentioned article. The first picture was coded as an intra picture I and all remaining pictures were coded as inter pictures either using P or B slices. A P slice is a slice that may be decoded using intra-prediction from decoded samples within the same slice or inter-prediction from previously-decoded reference pictures, using at most one motion vector and reference index to predict the sample values of each block, wherein a slice comprises an integer number of macro block or macro block pairs, a macro block is a block of picture samples, and a picture is divided up into macro blocks or macro block pairs. A B slice is a slice that may be decoded using inter-prediction from decoded samples within the same slice or inter-prediction from previously-decoded reference pictures, using at most two motion vectors and reference indices to predict the sample values of each block. For simplicity, we disallowed the use of intra-macro block code within the inter-pictures.

The results are shown in FIGS. 5a, 5b, 6a, and 6b. FIG. 5a and FIG. 5b show a graph in which the PSNR is plotted versus the bit-rate for the sequences of Flowergarden and Tempete, respectively, when using IBPBPBP . . . coding with one reference picture. FIGS. 6a and 6b show a graph in which PSNR is plotted versus bit-rate for the sequences of Flowergarden and Tempete, respectively, when using IBPBPBP . . . coding with one reference picture for P slices and two reference pictures for B slices. For both sequences, i.e. Flowergarden and Tempete, 50 frames were encoded at 30 Hz. For these experiments, parameters $\delta=0.5$ and $\Delta=1$ were used, and the iterations in the iterative algorithm, described above, were performed until all transform coefficient levels were determined.

FIGS. 5a and 5b show the results when coding the first picture as intra picture and all other pictures with P slices. We consider 1, 2 and 3 frames (K) jointly. The case K=1 was obtained using the test model. When moving from considering K=1 to K=2 pictures jointly, a PSNR gain of 1 dB can be measured for Flowergarden at the highest bit-rate end and 0.6 dB can be measured for Tempete. Moving from K=2 to K=3 provides another 0.4 dB for Flowergarden and 0.5 dB for Tempete summing up to about 1.4 dB and about 1.1 dB for the two sequences, respectively, for the case of moving from K=1 to K=3. For the latter comparison, the PSNR gains correspond to about 15% bit-rate savings for Flowergarden and about 18% bit-rate savings for Tempete.

FIGS. 6a and 6b show the results when coding the first picture as intra picture, every second picture with P slices and the immediate pictures with B slices. As can be seen, the gains are preserved in this case. When moving from considering K=1 to K=3 pictures jointly, a PSNR gain of about 1.0 dB is observed for Flowergarden and about 1.0 dB for Tempete. These PSNR gains correspond to about 15% bit-rate savings for Flowergarden and about 16% bit-rate savings for Tempete.

In the above description, a novel strategy of selecting transform coefficient levels considering the inter-frame dependencies produced by motion compensation in hybrid video coding was presented. A signal model for a hybrid video decoder was used as a constraint in a quadratic program. The signal model assumed linear dependencies between frames and a simplified rate model enabling the calculation of transform coefficient levels. The simulation resulted using the video coding standard H.264/AVC showed coding gains of up to 1.4 dB in comparison to the quantization strategy specified in the test model of H.264/AVC.

The above-explained embodiments may be extended in several ways. In order to create a quadratic program, a simplified signal model a rate model was used. A more accurate model having a resulting better PSNR bit-rate ratio, can be achieved by running the algorithm once looking at the discrepancies between the simplified model and reality, and then adding constant "correction factors". Of course, these correction factors themselves will cause other things to change so that an iteration is necessary until incremental improvement is below some threshold. In addition to correct factors, the motion estimation could be recalculated every iteration, i.e. every time where, in the iterative algorithm described above, the process goes from step 6 to step 1.

Moreover, a more accurate bit-rate approximation could be used. Moreover, measures could be taken to allow the inclusion of intra macro-block modes within the inter pictures. Moreover, other measures than described above with respect to FIG. 4 could be taken to extend the present invention to motion estimation using decoded pictures as a reference, toward inclusion of motion vectors variations, and the inclusion of quantization parameter changes.

Lastly, the above embodiments used a quadratic program as a convex optimization. However, the optimization problem could be formulated as another convex optimization in general. Although already indicated above, it is noted that the motion prediction information could be determined once for the hole video, without performing the motion prediction again after each forwarding of the sliding window.

Depending on an actual implementation, the inventive encoding scheme can be implemented in hardware or in software. Therefore, the present invention also relates to a computer program, which can be stored on a computer-readable medium such as a CD or a disk. The present invention is, therefore, also a computer program having a program code which, when executed on a computer, performs the inventive method of encoding or binarizing or the inventive method of decoding or recovering described in connection with the above figures.

Furthermore, it is noted that all steps indicated in the flow diagrams could be implemented by respective means in the encoder and that the implementations may comprise subroutines running on a CPU, circuit parts of an ASIC or the like.

What is claimed is:

1. A method for encoding a video signal comprising a sequence of pictures, the method being implemented on a computer and comprising the following steps:

determining a motion estimation among the sequence of pictures, the motion estimation enabling a motion-compensated prediction of a predetermined set of pictures of the sequence of pictures to obtain predicted pictures and residual data representing a deviation between the predetermined set of pictures and the predicted pictures;

setting parameters of an optimization problem based on the motion estimation and the predetermined set of pictures; and solving parameters of an optimization problem with the parameters being set, by means of convex optimization in order to yield optimized picture data that represents an encoded version of the residual data, wherein the optimization problem is a quadratic program problem of finding an optimal c so as to minimize a linear combination of a distortion and a bit rate formulated as $$\text{minimize } \{(v-s)^T(v-s)+\lambda R(c)\}$$

$$\text{subject to } s=Ms+Tc+p$$

where 1 is a vector with every entry being equal to 1, 0 is a vector with every entry being equal to zero, v is a vector the entries of which represent sample values of a predetermined set of pictures, c is a vector the entries of which represent transform coefficient levels representing a reconstruction of the residual data when transformed by means of a predetermined inverse transformation, M is a matrix reflecting motion estimation, T is a matrix depending on and reflecting the predetermined inverse transformation, s is a vector the entries of which represent decoded sample values, p is a vector, R denotes the bit rate and depends on a linear combination of the entries of c, wherein the parameter setter is designed to set v based on the predetermined set of pictures, M based on the motion estimation, and p based on the motion estimation and data representing pictures of the sequence of pictures outside the predetermined set of pictures, and wherein the solver is designed to solve a quadratic program equivalent to the quadratic program problem to yield, as the optimized picture data, optimized transform coefficient levels from c, and wherein the above video encoding steps are performed by the computer.

2. A nontransitory computer-readable medium having instructions stored thereon, for performing, when running on a computer, a method for encoding a video signal comprising a sequence of pictures, comprising the following steps:

determining a motion estimation among the sequence of pictures, the motion estimation enabling a motion-compensated prediction of a predetermined set of pictures of the sequence of pictures to obtain predicted pictures and residual data representing a deviation between the predetermined set of pictures and the predicted pictures;

setting parameters of an optimization problem based on the motion estimation and the predetermined set of pictures; and solving parameters of an optimization problem with the parameters being set, by means of convex optimization in order to yield optimized picture data that represents an encoded version of the residual data, wherein the optimization problem is a quadratic program problem of finding an optimal c so as to minimize a linear combination of a distortion and a bit rate formulated as $$\text{minimize } \{(v-s)^T(v-s)+\lambda R(c)\}$$

$$\text{subject to } s=Ms+Tc+p$$

where 1 is a vector with every entry being equal to 1, 0 is a vector with every entry being equal to zero, v is a vector the entries of which represent sample values of a predetermined set of pictures, c is a vector the entries of which represent transform coefficient levels representing a reconstruction of the residual data when transformed by means of a predetermined inverse transformation, M is a matrix reflecting motion estimation, T is a matrix depending on and reflecting the predetermined inverse transformation, s is a vector the entries of which represent decoded sample values, p is a vector, R denotes the bit rate and depends on a linear combination of the entries of c, wherein the parameter setter is designed to set v based on the predetermined set of pictures, M based on the motion estimation, and p based on the motion estimation and data representing pictures of the sequence of pictures outside the predetermined set of pictures, and wherein the solver is designed to solve a quadratic program equivalent to the quadratic program problem to yield, as the optimized picture data, optimized transform coefficient levels from c.

3. An encoder for encoding a video signal comprising a sequence of pictures, the encoder comprising:

a motion estimator for determining a motion estimation among the sequence of pictures, the motion estimation enabling a motion-compensated prediction of a predetermined set of pictures of the sequence of pictures to obtain predicted pictures and residual data representing a deviation between the predetermined set of pictures and the predicted pictures;

a parameter setter for setting parameters of an optimization problem based on the motion estimation and the predetermined set of pictures; and a solver for solving the optimization problem with the parameters being set, by means of convex optimization in order to yield optimized picture data that represents an encoded version of the residual data, wherein the optimization problem is a quadratic program problem of finding an optimal c so as to minimize a linear combination of a distortion and a bit rate formulated as $$\text{minimize } \{(v-s)^T(v-s) + \lambda R(c)\}$$

subject to $s = Ms + Tc + p$ where 1 is a vector with every entry being equal to 1, 0 is a vector with every entry being equal to zero, v is a vector the entries of which represent sample values of a predetermined set of pictures, c is a vector the entries of which represent transform coefficient levels representing a reconstruction of the residual data when transformed by means of a predetermined inverse transformation, M is a matrix reflecting motion estimation, T is a matrix depending on and reflecting the predetermined inverse transformation, s is a vector the entries of which represent decoded sample values, p is a vector, R denotes the bit rate and depends on a linear combination of the entries of c, wherein the parameter setter is designed to set v based on the predetermined set of pictures, M based on the motion estimation, and p based on the motion estimation and data representing pictures of the sequence of pictures outside the predetermined set of pictures, and wherein the solver is designed to solve a quadratic program equivalent to the quadratic program problem to yield, as the optimized picture data, optimized transform coefficient levels from c.

4. The encoder according to claim 3, wherein the optimization problem is a quadratic program, the parameter setter is designed to set parameters of the quadratic program, and the solver is a solver for solving the quadratic program with the parameters being set.

5. The encoder in accordance with claim 3, wherein the optimization problem and the solver are designed such that the optimized picture data comprises optimized transform coefficient values representing a reconstruction of the residual data when transformed by means of a predetermined inverse transformation.

6. The encoder of claim 3, wherein the optimization problem is further characterized with $R = 1^T r$ subject to $s = Ms + Tc + p$ where r is a vector with $r \geq c - \hat{w}1$, $r \geq -c - \hat{w}1$, and $r \geq 0$, and $\hat{w}$ is a constant, wherein the solver is designed to solve the quadratic program equivalent to the quadratic program problem, with s, c, and r being the optimization variables, to yield the optimized transform coefficient levels from c.

7. The encoder of claim 6, wherein the solver is designed to solve the quadratic program by a) presolving the quadratic program to yield non-integer optimized transform coefficient levels b) rounding a subset of the non-integer optimized transform coefficient levels, c) resolving the quadratic program for remaining non-integer transform coefficient levels with the subset of rounded optimized transform coefficient levels being fixed; and d) repeating the rounding and the resolving for the remaining non-integer transform coefficient levels.

8. The encoder of claim 7 wherein the quadratic program is $$\text{minimize } \{x^T H x + f^T x\}$$
$$\text{subject to } Ax = b$$
$$Ex \leq g$$

where, $$x = \begin{bmatrix} s \\ c \\ r \end{bmatrix},$$

$$H = \begin{bmatrix} I & 0 & 0 \\ 0 & 0 & 0 \\ 0 & 0 & 0 \end{bmatrix},$$

$$f = \begin{bmatrix} -2v \\ 0_N \\ \lambda 1_N \end{bmatrix},$$

$$A = [I - M \quad -T \quad 0],$$

$$b = p,$$

$$g = \begin{bmatrix} -\hat{w}1_N \\ -\hat{w}1_N \\ 0_N \end{bmatrix},$$

$$E = \begin{bmatrix} 0 & I & -I \\ 0 & -I & -I \\ 0 & 0 & -I \end{bmatrix},$$

9. The encoder of claim 7, wherein the solver is designed to resolve the quadratic program for each of the remaining non-integer transform coefficient levels with $\hat{w}$ being incremented for each resolving.

10. The encoder of claim 3 wherein the encoder is designed to output a portion of the optimized picture data corresponding to the first picture in the predetermined set of pictures while discarding the rest of the optimized picture data, and repeat the setting of the parameters and the solving of the optimization problem for a set of pictures succeeding the first picture.

11. The encoder of claim 10 wherein the encoder is designed to re-perform the motion estimation prior to the repetition of the setting and solving based on a reconstruction of the first picture, the reconstruction being based on the portion of the optimized picture data corresponding to the first picture.

12. The encoder of claim 3, further comprising:

an intra coder for encoding a reference picture of the sequence of pictures by treating the blocks within the frame as separate frames in the inter-coded case.

13. The encoder of claim 3, wherein the solver is designed to solve the quadratic program by a) presolving the quadratic program to yield non-integer optimized transform coefficient levels b) rounding a subset of the non-integer optimized transform coefficient levels, c) resolving the quadratic program for remaining non-integer transform coefficient levels with the subset of rounded optimized transform coefficient levels being fixed; and d) repeating the rounding and the resolving for the remaining non-integer transform coefficient levels.

14. The encoder of claim 3 wherein the encoder is designed to output a portion of the optimized picture data corresponding to the first picture in the predetermined set of pictures while discarding the rest of the optimized picture data, and repeat the setting of the parameters and the solving of the optimization problem for a set of pictures succeeding the first picture and partially overlapping with the predetermined set of pictures.

15. The encoder of claim 14 wherein the encoder is designed to re-perform the motion estimation prior to the repetition of the setting and solving based on a reconstruction of the first picture, the reconstruction being based on the portion of the optimized picture data corresponding to the first picture.

* * * * *